US009058378B2

(12) United States Patent
Schuil

(10) Patent No.: US 9,058,378 B2
(45) Date of Patent: Jun. 16, 2015

(54) SYSTEM AND METHOD FOR IDENTIFICATION OF NEAR DUPLICATE USER-GENERATED CONTENT

(75) Inventor: Robin Johan Schuil, Emmeloord (NL)

(73) Assignee: eBay Inc., San Jose, CA (US)

(*) Notice: Subject to any disclaimer, the term of this patent is extended or adjusted under 35 U.S.C. 154(b) by 384 days.

(21) Appl. No.: 12/101,561

(22) Filed: Apr. 11, 2008

(65) Prior Publication Data

US 2009/0259650 A1  Oct. 15, 2009

(51) Int. Cl.
G06F 17/00 (2006.01)
G06F 17/30 (2006.01)
G06Q 30/08 (2012.01)

(52) U.S. Cl.
CPC .......... *G06F 17/3069* (2013.01); *G06Q 30/08* (2013.01)

(58) Field of Classification Search
CPC .............................................. G06F 17/30864
USPC .................. 707/706, 737, 748, 749, 999.001, 707/999.002, 999.003
See application file for complete search history.

(56) References Cited

U.S. PATENT DOCUMENTS

| | | | |
|---|---|---|---|
| 6,038,668 A | | 3/2000 | Chipman et al. |
| 6,484,149 B1 | | 11/2002 | Jammes et al. |
| 6,658,423 B1 | * | 12/2003 | Pugh et al. ............................ 1/1 |
| 7,139,756 B2 | * | 11/2006 | Cooper et al. ........................ 1/1 |
| 8,046,372 B1 | * | 10/2011 | Thirumalai et al. .......... 707/749 |
| 2005/0144179 A1 | * | 6/2005 | Maruhashi et al. ........... 707/100 |
| 2006/0074859 A1 | * | 4/2006 | Gange et al. ....................... 707/3 |
| 2007/0129999 A1 | * | 6/2007 | Zhou et al. ....................... 705/14 |
| 2008/0263022 A1 | * | 10/2008 | Kostorizos et al. ............... 707/5 |
| 2009/0043767 A1 | * | 2/2009 | Joshi et al. ........................ 707/6 |
| 2010/0057559 A1 | * | 3/2010 | Wilf et al. .................. 705/14.49 |

FOREIGN PATENT DOCUMENTS

WO   WO-2009126296 A1   10/2009

OTHER PUBLICATIONS

"International Application Serial No. PCT/US2009/002231, Search Report mailed Jul. 21, 2009", 2 pgs.
"International Application Serial No. PCT/US 2009/ 002231, Written Opinion mailed Jul. 21, 2009", 7 pgs.
Broder, A. Z, "Identifying and Filtering Near-Duplicate Documents", *Combinatorial Pattern Matching, Lecture Notes in Computer Science*, (2000), 1-10.

(Continued)

*Primary Examiner* — Rehana Perveen
*Assistant Examiner* — Tiffany Thuy Bui
(74) *Attorney, Agent, or Firm* — Schwegman Lundberg & Woessner, P.A.

(57) ABSTRACT

A computer-implemented system and method relates to identifying near duplicate content. An example embodiment includes a data receiver to receive a first instance of user-generated content and a tokenizer to tokenize the first instance into a set of words, create a set of portions from the tokenized first instance, and assign weight to each portion of the set of portions. The example embodiment also includes a magnitude calculator to calculate a magnitude for the first instance based on the weight of each portion and a resemblance score calculator to search a data store for a second instance with at least one portion in common with the first instance and calculate a resemblance score between the first instance and the second instance.

28 Claims, 11 Drawing Sheets

(56) References Cited

OTHER PUBLICATIONS

Manku, G. S, et al., "Detecting near:-duplicates for web crawling", Proceedings of the 16$^{th}$ International Conference on the World Wide Web, May 8, 2007, 141-150.

"European Application Serial No. 09729770.9, Office Action mailed Oct. 19, 2012", 6 pgs.

"European Application Serial No. 09729770.9, Office Action mailed Dec. 14, 2010", 2 pgs.

"European Application Serial No. 09729770.9, Response filed Jan. 19, 2011 to Office Action mailed Dec. 14, 2010", 14 pgs.

"International Application Serial No. PCT/US 2009/ 002231, International Preliminary Report on Patentability mailed Oct. 21, 2010", 6 pgs.

\* cited by examiner

410

```
Used Hybrid Bikes
Peugeot
•      'Evasion', blue, small-medium, steel tubing, Shimano 70 GS 21-speed
components, cantilever brakes, 700c wheels, $169
•      'Orient Express', green, large, steel tubing, Shimano 21-speed,
cantilever brakes, 26" wheels w/street tires, $169

Largest selection of used bicycles in San Francisco, Oakland, Berkeley area!
Best Cycles
(510) 123-4567
2800 Telegraph Ave. / Stuart St.
Noon to 6pm most afternoons (closed Sundays)
```

420

```
Used Hybrid Bikes
Giant
•      'Cypress ST', red/silver, aluminum, mixte-style women's, Shimano/Grip-
shift 21-speed, V-brakes,  $229SR
•      'Campus Sport', women's, tall, blue lugged steel tubing, Shimano 10-
speed cafe handlebars, leather saddle, good original condition (1970's), $139
Trek
•      '7000 Multi Track', large, blue-grey/silver, aluminum, Shimano /Grip-
shift 21-speed, V-brakes, Shock seatpost, $239 Univega
•      'Rover-STI', large, grey, CrMo tubing, Shimano 200GS, 21-speed
components, cantilever brakes, fat 26" street tires, $169

Largest selection of used bicycles in San Francisco, Oakland, Berkeley area!
Best Cycles
(510) 123-4567
2800 Telegraph Ave. / Stuart St.
Noon to 6pm most afternoons (closed Sundays)
```

Figure 4

510 use, hybrid, bike, peugeot, evasion, blue, small-medium, steel, tube, shimano, 21-speed, component, cantilever, brake, 700c, wheel, orient, express, green, large, steel, tube, shimano, 21-speed, cantilever, brake, wheel, street, tire, large, select, use, bicycle, san, francisco, oakland, berkeley, area, best, cycle, noon, 6pm, most, afternoon, close, Sunday

520 use, hybrid, bike, giant, cypress, red, silver, aluminum, mixte-style, women, shimano, grip-shift, 21-speed, v-brake, campus, sport, women, tall, blue, lug, steel, tube, shimano, 10-speed, cafe, handlebar, leather, saddle, good, original, condition, 1970, trek, 7000, multi, track, large, blue-grey, silver, aluminum, shimano, grip-shift, 21-speed, v-brake, shock, seatpost, univega, rover-sti, large, grey, crmo, tube, shimano, 200gs, 21-speed, component, cantilever, brake, fat, street, tire, large, select, use, bicycle, san, francisco, oakland, berkeley, area, best, cycle, noon, 6pm, most, afternoon, close, Sunday

Figure 5

```
                                              ┌─ 610
                                             /
┌─────────────────────────────────────────────────────────────────────────┐
│ hybrid, bike, peugeot, evasion, steel, tube, shimano, 21-speed, cantilever, │
│ brake, 700c, wheel, orient, express, steel, tube, shimano, 21-speed,       │
│ cantilever, brake, wheel, tire, bicycle, cycle                             │
└─────────────────────────────────────────────────────────────────────────┘

┌─ 620
                                             /
┌─────────────────────────────────────────────────────────────────────────┐
│ hybrid, bike, giant, cypress, aluminum, mixte-style, shimano, grip-shift, 21-│
│ speed, v-brake, campus, sport, lug, steel, tube, shimano, 10-speed, cafe,   │
│ handlebar, leather, saddle, trek, 7000, track, blue-grey, aluminum, shimano,│
│ grip-shift, 21-speed, v-brake, shock, seatpost, univega, rover-sti, crmo,   │
│ tube, shimano, 200gs, 21-speed, cantilever, brake, fat, tire, bicycle, cycle│
└─────────────────────────────────────────────────────────────────────────┘
```

Figure 6

```
#, #, #, hybrid                        4437ebbb
#, #, hybrid, bike                     7d74e503
#, hybrid, bike, peugeot               089f791c
21-speed, cantilever, brake, 700c      66526894
21-speed, cantilever, brake, wheel     0b65f312
700c, wheel, orient, express           18c50690
bicycle, cycle, #, #                   84846dd0
bike, peugeot, evasion, steel          af2493d9
brake, 700c, wheel, orient             76e17c4a
brake, wheel, tire, bicycle            670e5dfb
cantilever, brake, 700c, wheel         09224684
cantilever, brake, wheel, tire         5d731fc1
cycle, #, #, #                         48d0e047
evasion, steel, tube, shimano          9438f318
express, steel, tube, shimano          c2fc8980
hybrid, bike, peugeot, evasion         47eef465
orient, express, steel, tube           6d235ee1
peugeot, evasion, steel, tube          528a1cb1
shimano, 21-speed, cantilever, brake   a9417737    (×2)
steel, tube, shimano, 21-speed         2ddfd88f    (×2)
tire, bicycle, cycle, #                0806b3e2
tube, shimano, 21-speed, cantilever    fc121bea    (×2)
wheel, orient, express, steel          7588e6b1
wheel, tire, bicycle, cycle            16f48282
```

```
                                                    ┌─── 720
                                                   /
┌─────────────────────────────────────────────────────────────────┐
│ #, #, #, hybrid                              4437ebbb           │
│ #, #, hybrid, bike                           7d74e503           │
│ #, hybrid, bike, giant                       7b99716e           │
│ 10-speed, cafe, handlebar, leather           abcac4ee           │
│ 21-speed, cantilever, brake, fat             e4568384           │
│ 21-speed, v-brake, campus, sport             f20bf050           │
│ 21-speed, v-brake, shock, seatpost           0c87559e           │
│ 200gs, 21-speed, cantilever, brake           6d6e4998           │
│ 7000, track, blue-grey, aluminum             ea7c16b8           │
│ aluminum, mixte-style, shimano, grip-shift   980f0e1f           │
│ aluminum, shimano, grip-shift, 21-speed      a87107e8           │
│ bicycle, cycle, #, #                         84846dd0           │
│ bike, giant, cypress, aluminum               b3bbcf74           │
│ blue-grey, aluminum, shimano, grip-shift     799d8a9d           │
│ brake, fat, tire, bicycle                    c306d1d2           │
│ cafe, handlebar, leather, saddle             3e24b1a1           │
│ campus, sport, lug, steel                    5fc78c9e           │
│ cantilever, brake, fat, tire                 9e92c868           │
│ crmo, tube, shimano, 200gs                   8a35a560           │
│ cycle, #, #, #                               48d0e047           │
│ cypress, aluminum, mixte-style, shimano      6445a559           │
│ fat, tire, bicycle, cycle                    34acd99a           │
│ giant, cypress, aluminum, mixte-style        2b2f8694           │
│ grip-shift, 21-speed, v-brake, campus        3d4b17bc           │
│ grip-shift, 21-speed, v-brake, shock         19646ba7           │
│ handlebar, leather, saddle, trek             ceef5558           │
│ hybrid, bike, giant, cypress                 bad18b6e           │
│ leather, saddle, trek, 7000                  8135ce77           │
│ lug, steel, tube, shimano                    75d5e1c1           │
│ mixte-style, shimano, grip-shift, 21-speed   95111c10           │
│ rover-sti, crmo, tube, shimano               7d0c5ed3           │
│ saddle, trek, 7000, track                    15402914           │
│ seatpost, univega, rover-sti, crmo           5c1cbfb6           │
│ shimano, 10-speed, cafe, handlebar           c540f804           │
│ shimano, 200gs, 21-speed, cantilever         cc141ec6           │
│ shimano, grip-shift, 21-speed, v-brake       fc4d9f94    (×2)   │
│ shock, seatpost, univega, rover-sti          7f28aa53           │
│ sport, lug, steel, tube                      79b96076           │
│ steel, tube, shimano, 10-speed               0527d4d8           │
│ tire, bicycle, cycle, #                      0806b3e2           │
│ track, blue-grey, aluminum, shimano          20223f95           │
│ trek, 7000, track, blue-grey                 c77b2c88           │
│ tube, shimano, 10-speed, cafe                ed6a01cc           │
│ tube, shimano, 200gs, 21-speed               2b3fd59b           │
│ univega, rover-sti, crmo, tube               7e071185           │
│ v-brake, campus, sport, lug                  1dab2ee5           │
│ v-brake, shock, seatpost, univega            bef8517d           │
└─────────────────────────────────────────────────────────────────┘
```

Figure 8

```
                                    ┌── 930
┌─────────────────────────────────────┴──────────────────────────────┐
│ bicycle, cycle, #, #           84846dd0      weight=6.725          │
│ tire, bicycle, cycle, #        0806b3e2      weight=7.452          │
└────────────────────────────────────────────────────────────────────┘
```

Figure 10

SYSTEM AND METHOD FOR IDENTIFICATION OF NEAR DUPLICATE USER-GENERATED CONTENT

BACKGROUND

1. Copyright Notice

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2006-2008, eBay Inc., All Rights Reserved.

2. Technical Field

This disclosure relates to methods and systems supporting online searching and transactions. More particularly, the present disclosure relates to identification of near duplicate user-generated content in a networked system.

3. Related Art

Electronic shopping systems currently exist which permit merchants to sell inventory to consumers over a computer network. Merchants now use computers to publish information about their products on one or more electronic pages (e.g., text and graphics displayable on a computer screen) and to elicit product orders from consumers. Likewise, consumers use computers to access information describing products and to communicate orders to a merchant.

With the increasing popularity and accessibility of the Internet, and particularly the World Wide Web, the number of merchants using and desiring to use the World Wide Web to advertise and sell products is growing rapidly. The World Wide Web is a global information system in which information is exchanged over the Internet using a set of standard protocols. An existing Web-based electronic store typically comprises a collection of Web pages which describe inventory (e.g. listings) and which include on-line forms allowing consumers to place orders or bids. Consumers use Web browsers to access the Web pages of electronic stores to examine information about available products and/or services (e.g. listings) and to submit product/service orders.

Merchants attempt to accurately describe their products or services in listings so the listings will be found by a high percentage of potential buyers who may be searching for similar products using network search engines. However, sellers often do not describe their offerings in a manner that maximizes their exposure to a large number of buyers. Further, on-line searching can be complicated by the large number of sellers, large number of product/service offerings, and the rapidly changing e-commerce marketplace. Sometimes, sellers may erroneously or intentionally post listings that are duplicates or near duplicates of existing listings to gain greater exposure without paying for the additional listings. These problems can also be encountered in other forms of user-generated content such as forums, blog comments, product reviews, and the like.

U.S. Pat. No. 6,484,149 describes a system and method for designing and operating an electronic store to (1) permit a merchant to organize and advertise descriptions of product inventory over the Internet, (2) permit Web page information to be extracted on-demand from a product inventory database, and (3) permit Web pages to be automatically customized to fit shopping behaviors of individual consumers. A graphical store design user interface of a Web browser displays a hierarchical representation of products and, product groups of an electronic store. A user manipulates icons of the Web browser store design user interface to cause a Web server to modify relationships between products and product groups stored in a product information database. A store designer creates HTML template files, embeds database and customize references within the template files, and assigns template files to groups or products of the electronic store.

U.S. Pat. No. 6,038,668 describes a networked catalog search, retrieval, and information correlation and matching system. The system allows suppliers to publish information in electronic catalogs, structure the information in an object oriented representation distributed across a network of computers, for example, the Internet. The system also enables customers to search and retrieve information on products and suppliers which match dynamically specified customer requirements. Through retrieving compliant HTML pages, a search engine forwards retrieved pages to an object oriented database which sorts received information by the information's internal organization structure. By searching the information as stored in the knowledge base, a user may quickly retrieve the stored information as highly tailored to the user's search strategy.

Thus, a computer-implemented system and method for identification of near duplicate user-generated content in a networked system are needed.

BRIEF DESCRIPTION OF THE DRAWINGS

Embodiments illustrated by way of example and not limitation in the figures of the accompanying drawings, in which:

FIGS. 4-10 illustrate examples of the user-generated content that is processed by a particular example embodiment.

DETAILED DESCRIPTION

Figure 1:
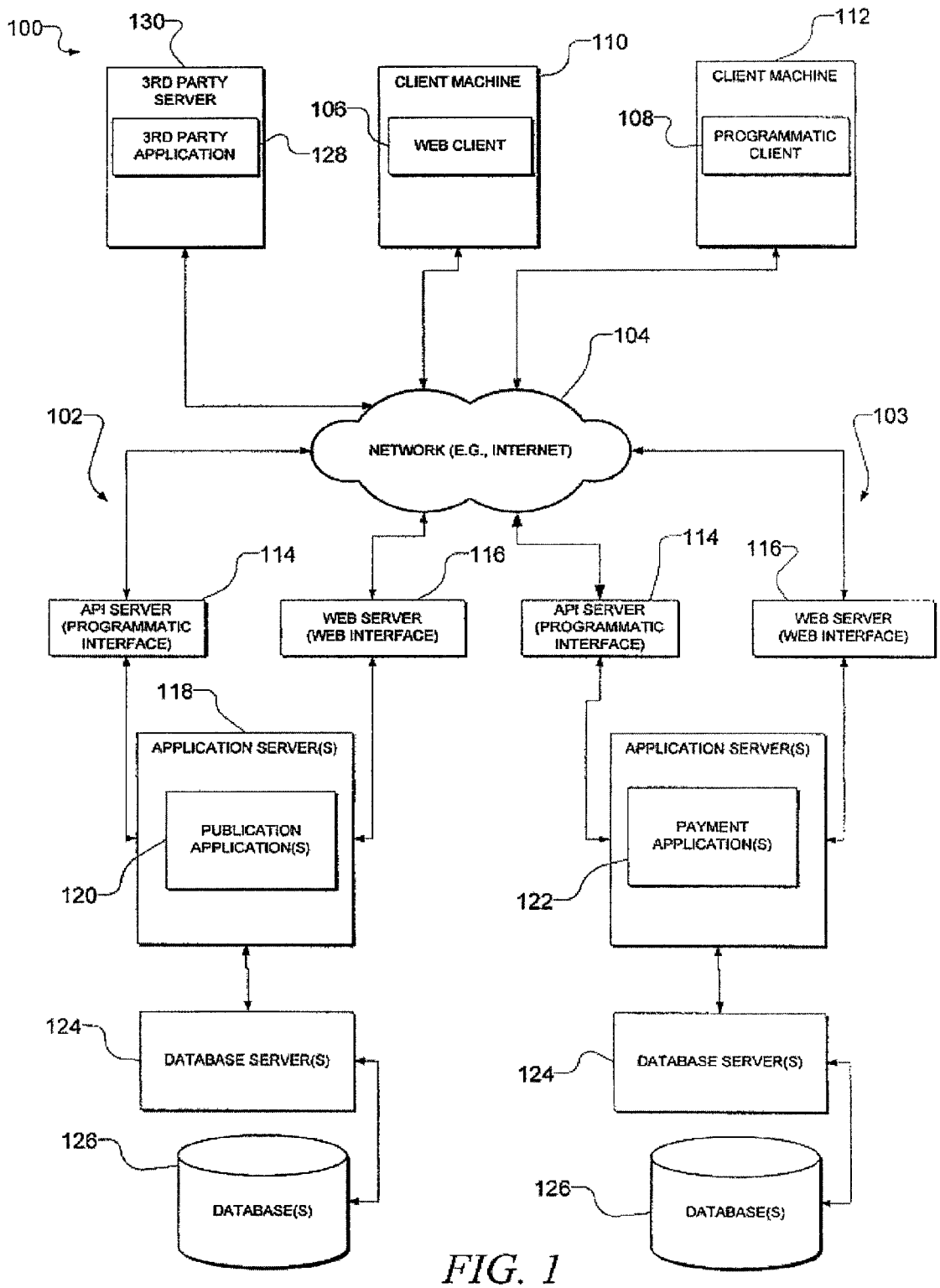
FIG. 1 is a block diagram of a network system on which an embodiment may operate.

In the following description, for purposes of explanation, numerous specific details are set forth in order to provide a thorough understanding of some example embodiments. It will be evident, however, to one of ordinary skill in the art that the present invention may be practiced without these specific details.

As described further below, according to various example embodiments of the disclosed subject matter described and claimed herein, there is provided a computer-implemented system and method for identification of near duplicate user-generated content in a networked system. In various embodiments, near duplicate user-generated content can include classified listings, product/service listings, forum content, blog comments, product reviews, surveys, and the like. The example system includes components and processes to automatically identify near duplicate user-generated content based on a measured degree of similarity between existing listings and a newly submitted listing. The example system further includes components and processes to link an account associated with identified near duplicate user-generated content to determine if the same account holder is responsible for submitting the identified near duplicate user-generated content. Various embodiments are described below in connection with the figures provided herein.

FIG. 4 illustrates an example of two similar instances of user-generated content (e.g. listings) that may be submitted to an online commerce site. The content of the listings 410 and 420 are intended to convey information about one or more items for sale by a seller. As described above, a particular seller may legitimately be attempting to sell different items with each of the listings 410 and 420. Additionally, two different sellers may legitimately be attempting to sell different items with each of the listings 410 and 420. It is also possible that one or more sellers may attempt to sell the same item with multiple listings that may be slightly altered so the listings are not exactly the same. A seller may attempt to sell the same item with multiple listings to get maximum exposure for the item without necessarily having to pay for multiple listings. In a particular embodiment, a system and method is described to detect near duplicate user-generated content. The basic process used in an example embodiment is described in more detail below.

In an example embodiment, we assume that listings 410 and 420 are included in an item database of item listings that is part of an online commerce site that is accessible by sellers and purchasers via a network. Sellers are provided with functionality to create, edit, and post their listings on the online commerce site. The listings can be stored in the item database. Purchasers/shoppers are provided with functionality to browse the item listings in the item database and to purchase items using a conventional e-commerce transaction processing system.

In a particular embodiment, a continuous or periodically executed indexing process can scan the listings in the item database for new/updated listings. For each listing, an indexer can parse the listing's title, description, and seller information. In a particular embodiment, the indexer can create a set of potentially overlapping portions from the information parsed from the listing. The set of portions can be used to gauge the similarity of two instances of user-generated content (e.g. documents). The indexer can further identify or define a number of tokens in each portion of the set. In mathematics, a subsequence of some sequence is a new sequence which is formed from the original sequence by deleting some of the elements without disturbing the relative positions of the remaining elements. A token is a categorized block of text. A lexical analyzer can process a block of text corresponding to the token to categorize the text according to function, giving the text meaning. This assignment of meaning is known as tokenization. A token can look like anything: English, gibberish symbols, character strings, and the like; the token just needs to be a useful part of the structured text.

As an example of tokenization in a particular embodiment, the following simple example illustrates the basic process. The instance of user-generated content (e.g. document), "a rose is a rose is a rose" can be tokenized as follows:

(a,rose,is,a,rose,is,a,rose)

The set of all contiguous sequences of 4 tokens (N-grams, here: 4-grams) is as follows:

{(a,rose,is,a), (rose,is,a,rose), (is,a,rose,is), (a,rose,is,a), (rose,is,a,rose)}

By removing duplicate elements from this set, a set of portions is obtained as follows:

{(a,rose,is,a), (rose,is,a,rose), (is,a,rose,is)}

In a manner described in more detail below, the indexer of an example embodiment performs the following operations on each instance of user-generated content (e.g. (listing) to identify near duplicate user-generated content: 1) tokenize the listing into a list of words, 2) remove un-descriptive words, 3) create a set of portions, 4) remove common portions, 5) assign weight to the portions, 6) calculate a magnitude for the document (e.g. listing), 7) store the document in the item database, 8) search for documents with a set of portions in common, 9) calculate a resemblance between two documents, 10) perform basic account linking, 11) store matches in the item database, 12) perform batch clustering, 13) prioritize clusters, 14) group by person, and 15) perform cluster review. Each of these operations for an example embodiment are described in more detail below.

Referring still to the example listings 410 and 420 shown in FIG. 4, an operation of the system and method of a particular embodiment may include tokenizing the listings into a list of words. As part of this operation, the listing is processed to remove common patterns from the content of the listing (e.g. prices, URL's, telephone numbers, addresses, and the like). Then, the listing is split into a list of words. Special characters and punctuation is removed. Words are stemmed (i.e. reduced to their stem, base or root form). Finally, tokens with a length of less than n characters (e.g. 3 characters) are ignored.

As an example of the tokenizing operation of a particular embodiment, word lists 510 and 520 illustrated in FIG. 5 show the result of the tokenizing operation as applied to the example listings 410 and 420, respectively shown in FIG. 4.

Referring still to the example word lists 510 and 520 illustrated in FIG. 5, another operation of the system and method of a particular embodiment may include removing un-descriptive words from the lists of words. As part of this operation, the word lists are processed to remove any 'un-descriptive' words. In a particular embodiment, descriptive words can be defined as follows: words that occur in less than n % (e.g. 5%) of all documents in the repository (e.g. listings in the item database). Listings containing this descriptive word are highly concentrated in a small number of top level item categories (e.g. 80% or more of all occurrences of listings with this descriptive word are found in no more than 20% of all top level item categories). By applying the un-descriptive word removal operation as described above, we remove the noise from the lists of words. This operation greatly speeds up the process of finding duplicate user-generated content, and makes the process less sensitive to un-important changes to the text.

As an example of the un-descriptive word removal operation of a particular embodiment, processed word lists 610 and 620 illustrated in FIG. 6 show the result of the un-descriptive word removal operation as applied to the example word lists 510 and 520, respectively shown in FIG. 5.

Referring still to the example processed word lists 610 and 620 shown in FIG. 6, an operation of the system and method of a particular embodiment may include creating a set of portions from the processed word lists. As part of this operation, the processed word lists are further processed to create a set of unique portions. As described above, a portion can be a contiguous subsequence of tokens. After the set of portions have been created, a hash value is calculated for each one of them and the set of portions are sorted alphabetically.

As an example of the portion creation operation of a particular embodiment, portions 710, each with a corresponding hash value, illustrated in FIG. 7 are created from the processed word list 610 illustrated in FIG. 6. Similarly, portions 720, each with a corresponding hash value, illustrated in FIG. 8 are created from the processed word list 620 illustrated in FIG. 6.

Referring still to the example sets of portions 710 and 720 shown in FIGS. 7 and 8, an operation of the system and method of a particular embodiment may include removing common portions from the processed sets of portions. As part of this operation, the processed sets of portions are further processed to remove common portions from the set of unique portions. Common portions can be defined as: portions that occur in more than n (e.g. 1000) documents in the entire repository.

Figure 9:
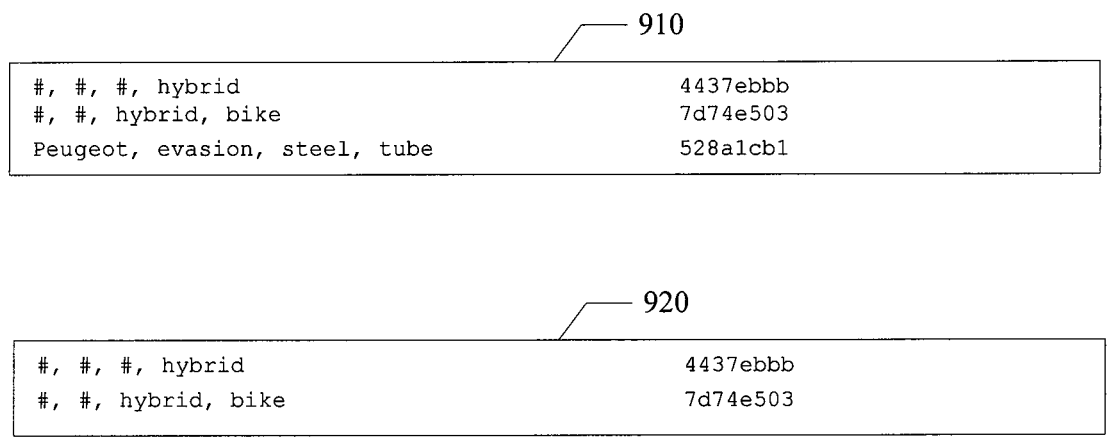

As an example of the common portion removal operation of a particular embodiment, portions 910, each with a corresponding hash value, illustrated in FIG. 9 are removed from the set of portions 710 illustrated in FIG. 7. Similarly, portions 920, each with a corresponding hash value, illustrated in FIG. 9 are removed from the set of portions 720 illustrated in FIG. 8.

Referring still to the example sets of portions 710 and 720 shown in FIGS. 7 and 8, an operation of the system and method of a particular embodiment may include assigning weight to each of the portions in the processed sets of portions. As part of this operation, the processed sets of portions are further processed to calculate a weight of each portion, based on the number of occurrences of that portion in the entire repository. Rare portions are considered more important than common ones. In a particular embodiment, we use the function weight=log(N/n), where N denotes the total number of documents in the repository and n denotes the number of documents that contain that portion. It will be apparent to those of ordinary skill in the art that other equivalent methods for assigning weight to each portion can be used.

Another operation of the system and method of a particular embodiment may include calculating a magnitude for the entire document (e.g. listing). As part of this operation, the weighted sets of portions, as produced in the manner described above, are used to calculate a document magnitude. Using the portion weights, we can now calculate the Euclidian norm for the document associated with a particular set of weighted portions. The Euclidian norm for the document can be derived from the Euclidian distance: the square root of the dot product of the document vector with itself. For example:

$$\|x\|:=\sqrt{(x_1^2+\ldots+x_n^2)}$$

Where $x=[x_1, x_2, \ldots, x_n]$, the document vector of unique portions.

Another operation of the system and method of a particular embodiment may include storing the document (e.g. listing) and related information, as derived in the manner described above, in a database (e.g. item database). The document vector containing the hash values of the document portions and the document magnitude can be stored in a relational database management system (RDBMS), or other form of database or data store, for future retrieval.

Referring still to the example sets of portions 710 and 720 shown in FIGS. 7 and 8, an operation of the system and method of a particular embodiment may include searching the database (e.g. item database) for documents (e.g. listings) with portions in common. As part of this operation, the database, containing document information including associated sets of portions, hash values, and document magnitudes, is queried for all documents which have at least n portions in common with a current document against which database documents are being compared. The value n can be a fixed threshold (e.g. 3), but preferably it is relative to the size of the current document's vector (e.g. 5%). The database query returns the unique identifier, the list of hash values of all matching portions and the magnitude of all documents which meet the query's criteria.

As an example of the database search for common portions operation of a particular embodiment, portions 930, each with a corresponding hash value and weight, illustrated in FIG. 10 are returned as the result of a database query comparing the set of portions 710 illustrated in FIG. 7 against the set of portions 720 illustrated in FIG. 720.

Once the document vectors are calculated and the item database is queried for common portions relative to each document as described above, a resemblance score can be calculated in another operation of a particular embodiment. As part of this resemblance score determination operation, various methods can be used to determine the resemblance score. For example, a Cosine Measure or the Tanimoto Coefficient can be calculated as part of the resemblance score determination operation. Cosine measure is a measure of similarity between two document vectors of n dimensions by finding the angle between them. Given two document vectors of attributes, A and B, the cosine similarity, θ, is represented using a dot product and magnitude as follows:

$$\theta = \arccos \frac{A \cdot B}{\|A\|\|B\|}.$$

The attribute vectors A and B can include the vectors of the documents as derived in the manner described above.

Because the angle, θ, is in the range of [0,π], the resulting similarity will yield the value of π as meaning exactly opposite, π/2 meaning independent, 0 meaning exactly the same, with in-between values indicating intermediate similarities or dissimilarities.

In a particular embodiment, the Tanimoto Coefficient is used to determine the resemblance score. The Tanimoto Coefficient is an extension of the Cosine Measure process. The Cosine Measure process may be extended such that it yields the Jaccard coefficient in the case of binary attributes. This is the Tanimoto coefficient, T(A,B), represented as follows:

$$T(A,B)=A \cdot B/(\|A\|^2+\|B\|^2-A \cdot B)$$

The attribute vectors A and B can include the vectors of the documents as derived in the manner described above. If T(A, B) is equal to or greater than a given threshold t, the two documents are considered near duplicate. If the resemblance score is lower than t, the two documents are considered not near duplicate and the document being processed is ignored and will not make it to the next step. The given threshold t can be configured to produce acceptable results in a particular circumstance.

Using the operations described above, a resemblance score for user-generated content (e.g. documents or listings) in a database can be calculated. As a result, a set of near duplicate (or sufficiently similar) documents can be identified. These near duplicate documents may represent near duplicate user-generated content in an e-commerce application. Although the near duplicate user-generated content can be identified as described above, it is not clear at this point if the near duplicate user-generated content are legitimate and allowable or otherwise. In a particular application, it may not be considered appropriate to allow two different sellers/advertisers to have near duplicate user-generated content. One additional operation performed in a particular embodiment is the linking of accounts associated with each of the identified near duplicate user-generated content. As part of this account linking operation, various methods can be used to compare seller/advertiser accounts associated with particular identified near duplicate user-generated content. In a particular embodiment, each document is created by a user (e.g. the seller or advertiser of the item). Each document can contain the account identifier (ID) of the seller who posted the listing. If two documents were identified as near duplicate, but they belong to different accounts, we can perform some basic account linking operations to test if these accounts may belong to the same person. This operation involves a set of heuristic and statistical rules that are dependant on the application and can be adapted to include more or less user data and tests.

In a particular embodiment, basic account linking can be performed as follows:

1. Fetch user data from all documents from user A and user B.
    User data including, but not limited to:
        Display name
        E-mail address
        Zipcode
        IP address
        Password hash
        Universally Unique Identifier (UUID) from HTTP cookie
2. Compare all data from both users and see if there is any intersection
    Calculate the Levenshtein distance or Lossy Unary Letter Aliasing (LULA) distance of the Display name and E-mail address to test if they are very similar. The calculation of the Levenshtein distance and the Lossy Unary Letter Aliasing (LULA) distance is well known to those of ordinary skill in the art.
    Check if the zipcodes are the same
    Check if the C subnet (255.255.255.0) of the IP address is the same
    Check if the password hash is the same (in that case both accounts use the same password)
    Check if the UUID is matches. Every visitor to a particular site stores an UUID in the HTTP cookies. These are stored with the documents when posted to the site.
3. If any intersection was found between the user data of all documents from both users, the accounts are linked and the two documents pass the test.

As performed in the operations described above, user-generated content (e.g. documents or listings) can be identified as near duplicates and associated accounts can be linked. Once two documents are identified as near duplicate and they are likely to belong to the same person, we store the {document, document} relationship in the database, along with it's resemblance score. This information is used to query all near duplicates of a specific document, and for the batch clustering process described below.

Once documents in the item database are identified as near duplicate, the near duplicate documents can be clustered into groups or clusters of similar documents (e.g. similar listings). In a particular embodiment, a batch process is executed at a given interval (e.g. every hour) that groups all near duplicate documents found into clusters. To perform this clustering operation, we can use a union-find process. In a particular embodiment, the union-find process can perform two operations: 1) Find: determine of which document set a particular document is a member; and 2) Union: combine or merge two document sets into a single document set. The amortized running time per Find and Union operation is effectively a small constant and allows very fast and efficient document clustering.

When we have grouped the near duplicate documents into sets of clusters, we can prioritize each cluster based on a number of different factors as detailed below for a particular example embodiment:

1. The resemblance scores of all documents in the cluster (x).
2. Percentage of documents in the cluster that have not yet been reviewed before by a Community Protection representative (r).
3. The total count of documents in the cluster that have been flagged as duplicate by buyers (f).
4. The probability that a particular user has posted duplicate documents, based on the user's historical track record (p).

In alternative embodiments, other factors may be added to generate a cluster priority. There are numerous ways to calculate a cluster priority using these factors and optionally other information. In a particular embodiment, a cluster priority can be generated using the calculation detailed below:

$$\text{Cluster Priority} = \|x\| \times f \times (0.15 + p \times 0.85)$$

In a particular embodiment, document clusters with a value for r less than 0.5 can be ignored. Information related to all other document clusters can be written to the item database.

Once document clusters have been prioritized and related information is stored in the item database, another operation of an example embodiment is to group all clusters by person (e.g. one group of clusters can include multiple accounts, linked by the basic account linking method described above). For each group, a weight can be assigned to the group. In a particular embodiment, the cluster group weight represents the sum of all priorities of the clusters in that group.

In a particular embodiment, a Community Protection department can manually review the cluster groups created in the manner described above. As part of this review, the Community Protection department representative (CPR) can use a tool to query the next highest prioritized cluster and display all clusters and their documents in this group. If the Community Protection representative agrees that these listings are (near) duplicate, they are removed from the host site immediately. The user's probability scores are updated when the CPR has finished reviewing the group.

Figure 11:
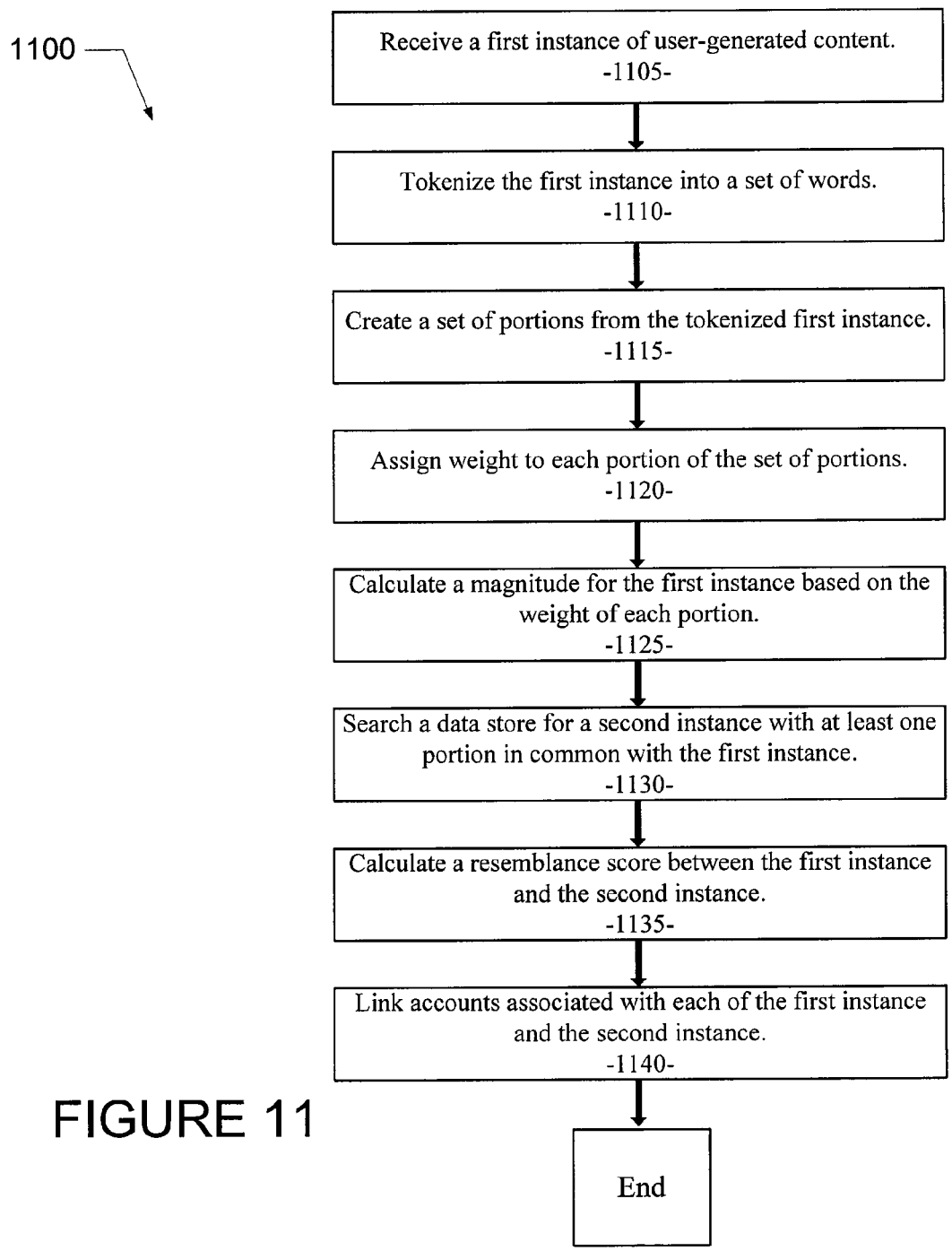
FIG. 11 is a processing flow diagram of an example embodiment.

FIG. 11 illustrates a processing flow diagram of a particular embodiment. In the illustrated embodiment, the disclosed system and method receive a first instance of user-generated content (processing block 1105); tokenize the first instance into a set of words (processing block 1110); create a set of portions from the tokenized first instance (processing block 1115); assign weight to each portion of the set of portions (processing block 1120); calculate a magnitude for the first instance based on the weight of each portion (processing block 1125); search a data store for a second instance with at least one portion in common with the first instance (processing block 1130); calculate a resemblance score between the first instance and the second instance (processing block 1135); and link accounts associated with each of the first instance and the second instance (processing block 1140).

Platform Architecture

FIG. 1 is a network diagram depicting a client-server system 100, within which one example embodiment may be deployed. A networked system 102, in the example forms a network-based marketplace or publication system, provides server-side functionality, via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Washington State), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Marketplace Applications

Figure 2:
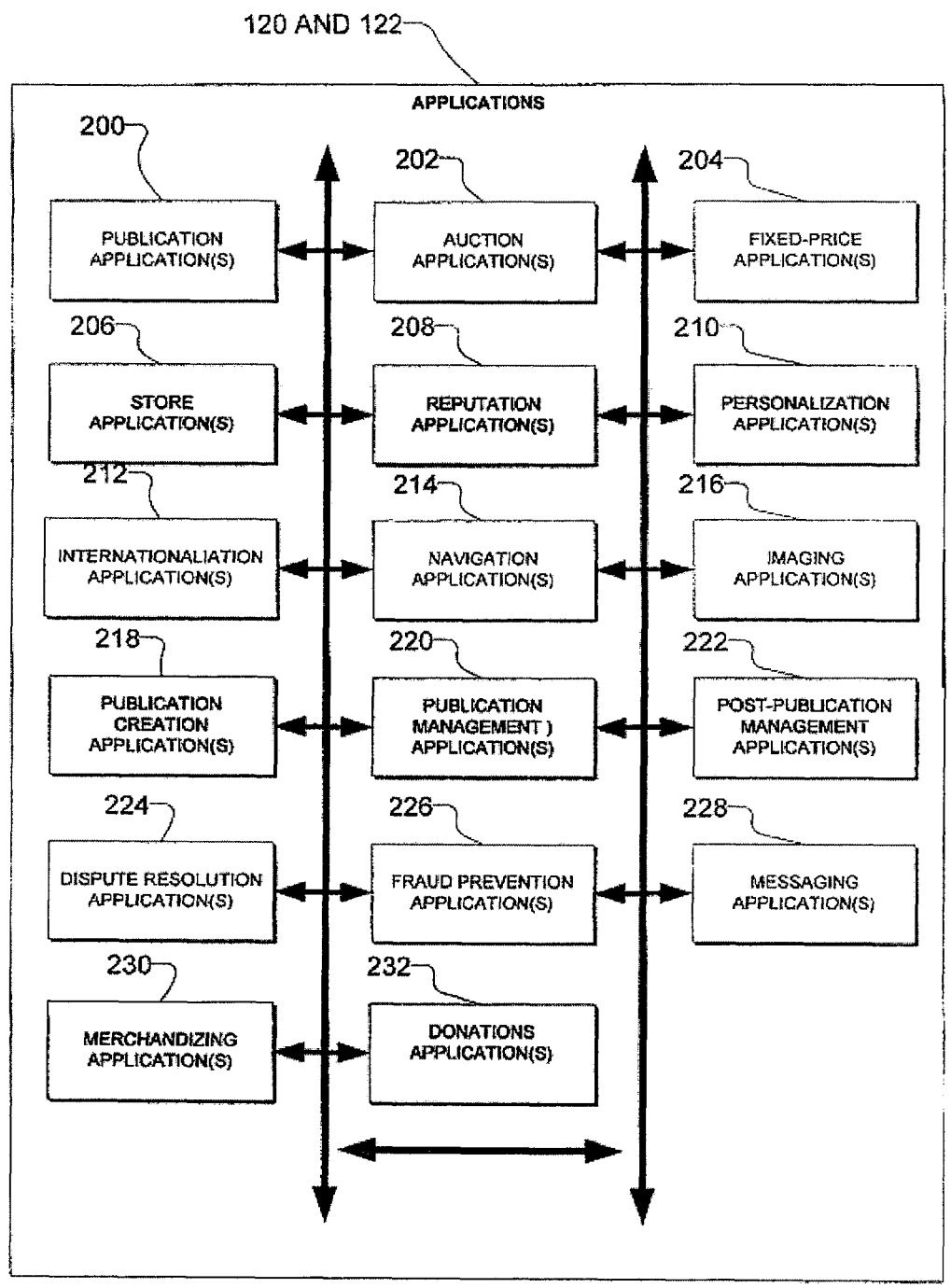
FIG. 2 is a block diagram illustrating multiple applications that, in one example embodiment, are provided as part of the networked system.

FIG. 2 is a block diagram illustrating multiple applications 120 and 122 that, in one example embodiment, are provided as part of the networked system 102. The applications 120 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 126 via the database servers 124.

The networked system 102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 120 are shown to include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user, for example through feedback provided by other transaction partners, to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace, or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable key word searches of listings published via the networked system 102. A browse application may allow users to browse various category, catalogue, or inventory data structures according to which listings may be classified within the networked system 102. Various other navigation applications may be provided to supplement the search and browsing applications.

In order to make listings, available via the networked system 102, as visually informing and attractive as possible, the marketplace applications 120 may include one or more imaging applications 216 utilizing which users may upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers conveniently to author listings pertaining to goods or services that they wish to transact via the networked system 102. The above described tag engine 500, in example embodiment, forms a component or module of the listing creation applications 218.

Listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102. Messaging applications 228 are responsible for the generation and delivery of messages to users of the networked system 102, such messages for example advising users regarding the status of listings at the networked system 102 (e.g., providing "outbid" notices to bidders during an auction process or to provide promotional and merchandising information to users). Respective messaging applications 228 may utilize any one have a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 80 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotions points for each transaction established and/or concluded with a particular seller, and be offered a reward for which accumulated loyalty points can be redeemed.

Modules, Components and Logic

Certain embodiments are described herein as including logic or a number of modules, components or mechanisms. A module, logic, component or mechanism (herein after collectively referred to as a "module") may be a unit capable of performing certain operations and is configured or arranged in a certain manner. In example embodiments, one or more computer systems (e.g., a standalone, client or server computer system) or one or more components of a computer system (e.g., a processor or a group of processors) may be configured by software (e.g., an application or application portion) as a "module" that operates to perform certain operations as described herein.

In various embodiments, a "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g., configured by software) may be driven by cost and time considerations.

Accordingly, the term "module" should be understood to encompass a entity, be that an entity that is physically constructed, permanently configured (e.g., hardwired) or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, a one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

Electronic Apparatus and System

Example embodiments may be implemented in digital electronic circuitry, or in computer hardware, firmware, software, or in combinations of them. Example embodiments may be implemented using a computer program product, e.g. a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination permanently and temporarily configured hardware may be a design choice. Below are set out hardware (e.g., machine) and software architectures that may be deployed, in various example embodiments.

Example Machine Architecture and Machine-Readable Medium

Figure 3:
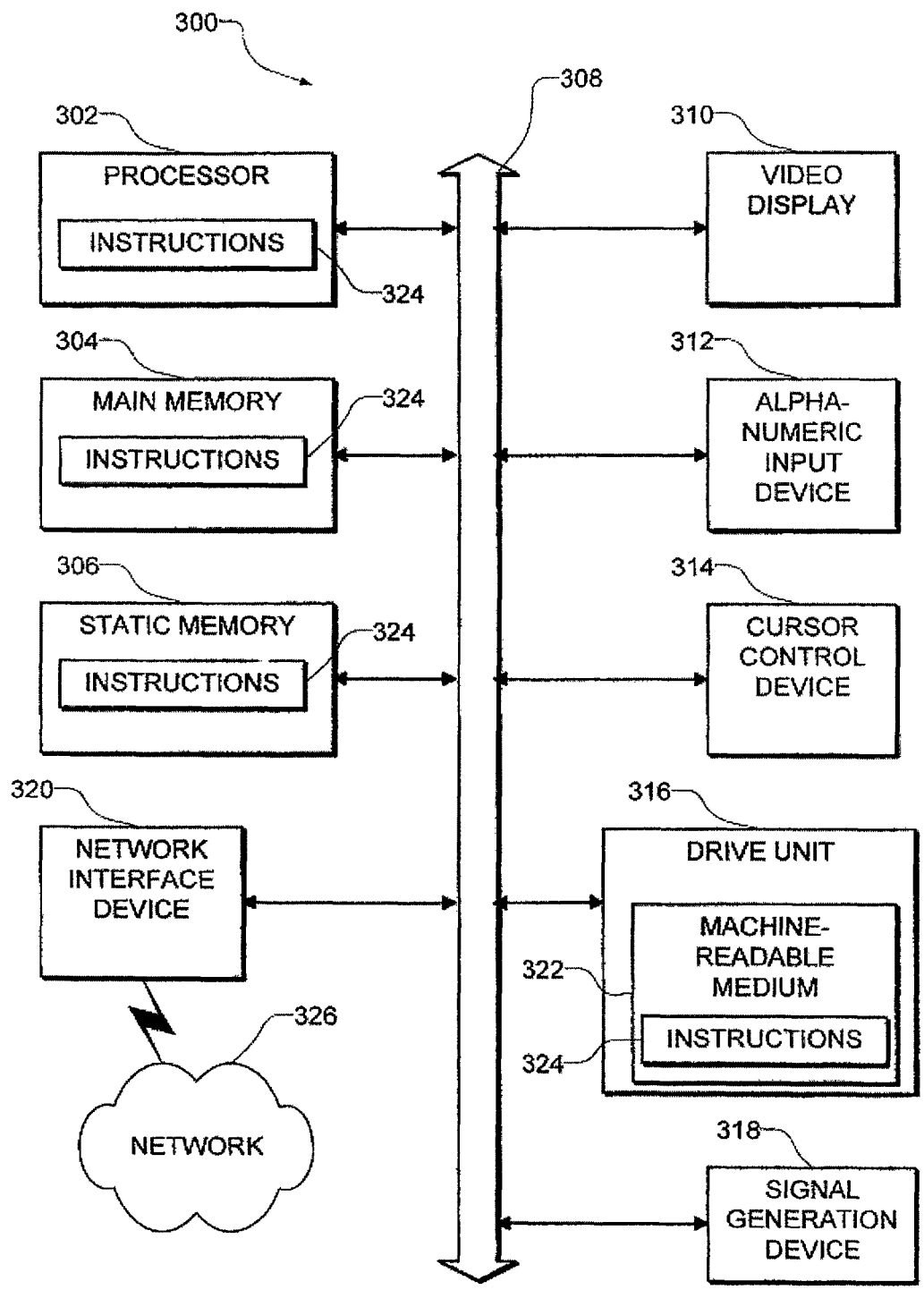
FIG. 3 is a block diagram of machine in the example form of a computer system within which instructions, for causing the machine to perform any one or more of the methodologies discussed herein, may be executed.

FIG. 3 is a block diagram of machine in the example form of a computer system 300 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

Machine-Readable Medium

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

While the machine-readable medium 322 is shown in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

Transmission Medium

The software 324 may further be transmitted or received over a communications network 326 using a transmission medium via the network interface device 320 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks) The term "transmission medium" shall be taken to include any intangible medium that is capable of storing, encoding or carrying instructions for execution by the machine, and includes digital or analog communications signals or other intangible medium to facilitate communication of such software.

Example Three-Tier Software Architecture

In some embodiments, the described methods may be implemented using one a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules, or processes that govern the software as a whole. A third, storage tier, may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology, or, a variety of technologies. The example three-tier architecture, and the technologies through which it is implemented, may be realized on one or more computer systems operating, for example, as a standalone system, or organized in a server-client, peer-to-peer, distributed or so some other suitable configuration. Further, these three tiers may be distributed between more than one computer systems as various components.

Example embodiments may include the above described tiers, and processes or operations about constituting these tiers may be implemented as components. Common too many of these components is the ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various Application Programming interfaces (APIs)), and may be compiled into one complete server, client, and/or peer software application. Further, these APIs may be able to communicate through various distributed programming protocols as distributed computing components.

Some example embodiments may include remote procedure calls being used to implement one or more of the above described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived there from, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Thus, a computer-implemented system and method for identification of near duplicate user-generated content in a networked system are disclosed. While the present invention has been described in terms of several example embodiments, those of ordinary skill in the art will recognize that the present invention is not limited to the embodiments described, but can be practiced with modification and alteration within the spirit and scope of the appended claims. The description herein is thus to be regarded as illustrative instead of limiting.

What is claimed is:
1. A method comprising:
receiving a first instance of user-generated content, the content being any part of a content repository related to product offerings in a network-based marketplace;
tokenizing, by use of a processor, the first instance into a set of words parsed from the first instance content;
creating a set of portions from the tokenized first instance, each portion of the set of portions comprising a plurality of tokens parsed from the tokenized first instance;
assigning weight to each portion of the set of portions, the weight being based on a quantity of occurrences of that corresponding portion in the content repository;
calculating a magnitude for the first instance based on the weight of each portion;

searching the content repository for a second instance with at least one portion in common with the first instance, the second instance including content that is any part of the content repository;

calculating a resemblance score between the first instance and the second instance; and in response to the resemblance score being equal to or greater than a pre-defined threshold, testing whether accounts associated with each of the first instance and the second instance belong to the same user by comparing user data associated with the accounts, the user data identifying a user or an account and being distinct from the user-generated content; and in response to finding an intersection between the user data associated with the accounts, linking the accounts.

2. The method as claimed in claim 1 further including:
removing un-descriptive words from the set of words.

3. The method as claimed in claim 1 further including:
removing common portions from the set of portions.

4. The method as claimed in claim 1 wherein the magnitude calculated for the first instance is a Euclidian norm.

5. The method as claimed in claim 1 further including:
using a cosine measure to calculate a resemblance score between the first instance and the second instance.

6. The method as claimed in claim 1 further including:
using a Tanimoto Coefficient to calculate a resemblance score between the first instance and the second instance.

7. The method as claimed in claim 1 wherein the linking of accounts can be used to determine if the first and second instances originated from a same source.

8. The method as claimed in claim 1 further including:
determining if the first instance and the second instance are near duplicates.

9. The method as claimed in claim 1 further including:
grouping near duplicate instances into sets of clusters.

10. The method as claimed in claim 9 further including:
prioritizing the sets of clusters.

11. The method as claimed in claim 9 further including:
grouping the sets of clusters by person.

12. An apparatus comprising:
a processor;
a data receiver, in data communication with the processor, to receive a first instance of user-generated content, the content being any part of a content repository related to product offerings in a network-based marketplace;
a tokenizer to tokenize the first instance into a set of words parsed from the first instance content, create a set of portions from the tokenized first instance, each portion of the set of portions comprising a plurality of tokens parsed from the tokenized first instance, and assign weight to each portion of the set of portions, the weight being based on a quantity of occurrences of that corresponding portion in the content repository;
a magnitude calculator to calculate a magnitude for the first instance based on the weight of each portion;
a resemblance score calculator to search the content repository for a second instance with at least one portion in common with the first instance and calculate a resemblance score between the first instance and the second instance, the second instance including content that is any part of the content repository; and
an account linker to test, in response to the resemblance score being equal to or greater than a pre-defined threshold, whether accounts associated with each of the first instance and the second instance belong to the same user by comparing user data associated with the accounts, the user data identifying a user or an account and being distinct from the user-generated content, the account linker further to link the accounts in response to finding an intersection between the user data.

13. The apparatus as claimed in claim 12 being further configured to remove un-descriptive words from the set of words.

14. The apparatus as claimed in claim 12 being further configured to remove common portions from the set of portions.

15. The apparatus as claimed in claim 12 wherein the magnitude calculated for the first instance is a Euclidian norm.

16. The apparatus as claimed in claim 12 being further configured to use a cosine measure to calculate a resemblance score between the first instance and the second instance.

17. The apparatus as claimed in claim 12 being further configured to use a Tanimoto Coefficient to calculate a resemblance score between the first instance and the second instance.

18. The apparatus as claimed in claim 12 wherein the linking of accounts can be used to determine if the first and second instances originated from a same source.

19. The apparatus as claimed in claim 12 being further configured to determine if the first instance and the second instance are near duplicates.

20. The apparatus as claimed in claim 12 being further configured to group duplicate instances into sets of clusters.

21. The apparatus as claimed in claim 20 being further configured to prioritize the sets of clusters.

22. The apparatus as claimed in claim 20 being further configured to group the sets of clusters by person.

23. An article of manufacture comprising a non-transitory machine-readable storage medium having machine executable instructions embedded thereon, which when executed by a machine, cause the machine to:
receive a first instance of user-generated content, the content being any part of a content repository related to product offerings in a network-based marketplace;
tokenize the first instance into a set of words parsed from the first instance content;
create a set of portions from the tokenized first instance, each portion of the set of portions comprising a plurality of tokens parsed from the tokenized first instance;
assign weight to each portion of the set of portions, the weight being based on a quantity of occurrences of that corresponding portion in the content repository;
calculate a magnitude for the first instance based on the weight of each portion;
search the content repository for a second instance with at least one portion in common with the first instance, the second instance including content that is any part of the content repository;
calculate a resemblance score between the first instance and the second instance;
test, in response to the resemblance score being equal to or greater than a pre-defined threshold, whether accounts associated with each of the first instance and the second instance belong to the same user by comparing user data associated with the accounts; and
link the accounts associated with each of the first instance and the second instance in response to finding an intersection between the user data associated with the accounts, the user data identifying a user or an account and being distinct from the user-generated content.

24. The article of manufacture as claimed in claim 23 being further configured to remove un-descriptive words from the set of words.

25. The article of manufacture as claimed in claim 23 being further configured to remove common portions from the set of portions.

26. The method of claim 1, wherein the user data comprises at least one of the user's display name, e-mail address, zip code, password hash, IP address, or Universally Unique Identifier stored in a cookie.

27. The apparatus of claim 12, wherein the user data comprises at least one of the user's display name, e-mail address, zip code, password hash, IP address, or Universally Unique Identifier stored in a cookie.

28. The article of manufacture of claim 23, wherein the user data comprises at east one of the user's display name, e-mail address, zip code, password hash, W address, or Universally Unique Identifier stored in a cookie.

* * * * *

UNITED STATES PATENT AND TRADEMARK OFFICE
CERTIFICATE OF CORRECTION

| | | |
|---|---|---|
| PATENT NO. | : 9,058,378 B2 | Page 1 of 1 |
| APPLICATION NO. | : 12/101561 | |
| DATED | : June 16, 2015 | |
| INVENTOR(S) | : Robin Johan Schuil | |

It is certified that error appears in the above-identified patent and that said Letters Patent is hereby corrected as shown below:

Claims

In column 18, line 27, in Claim 20, after "group", insert --near--, therefor

In column 19, line 13, in Claim 28, delete "east" and insert --least--, therefor In column 19, line 14, in Claim 28, delete "W" and insert --IP--, therefor Signed and Sealed this
Twelfth Day of April, 2016

Michelle K. Lee
*Director of the United States Patent and Trademark Office*